Patented June 29, 1948

2,444,357

UNITED STATES PATENT OFFICE 2,444,357

LUBRICANT FOR DRILLS AND CUTTING TOOLS

Jack H. Maguire, Glendale, Calif., assignor to Lockheed Aircraft Corporation, Burbank, Calif.

No Drawing. Application November 25, 1944, Serial No. 565,185

8 Claims. (Cl. 252—36)

This invention relates to lubricants and relates more particularly to lubricants for drills, saws and other cutting tools.

It is well known that the life of drills and cutting tools is materially increased when an effective lubricant is maintained at the cutting edges. Furthermore, cleaner and more accurate work is possible with properly lubricated tools.

Drill breakage due to improper or insufficient lubrication is often a source of considerable expense in shops and factories where drills are used extensively. Beeswax and grease are sometimes employed to lubricate the drills, but neither of these materials is particularly effective. Beeswax has a low melting point and poor adherence to the tools. Grease has low adherence and is thrown from the rotating drill or rapidly moving tool. Workmen frequently do not lubricate the tools or drills as often as necessary, where grease is provided as the lubricant because the grease soils the hands, clothing and the machinery when it is thrown free from the rotating drill or tool.

It is an object of this invention to provide a highly effective cutting lubricant for drills and cutting tools in general. The improved lubricant of this invention has a high melting point, good adherence to the tool surfaces and effective work penetration.

Another object of the invention is to provide a lubricant of the character referred to that is clean and economical to use. The lubricant of the present invention is a solid and may be supplied in the form of cakes, sticks, etc., with or without suitable containers of paper, or the like. When a drill is to be lubricated it is merely thrust against or into a solid body of the lubricant. This cools the drill and a suitable quantity of the lubricant adheres to the tool to assure adequate lubrication during subsequent tool operation. There is no wastage, and the lubricant is not thrown from the drill when it is rotated. In the case of saws and similar tools, the solid lubricant may be rubbed or wiped onto the tool surfaces much in the manner that belt dressing is applied to a belt. The workman's hands and clothing are not soiled and the lubricant is not thrown about to soil the adjacent machinery. Where the lubricant of the present invention is employed it is a simple matter to lubricate the drill or other tool at the required intervals, and the workman is not deterred by the fact that lubricating of the tool will soil his hands and clothing.

Another object of this invention is to provide a lubricant of the character mentioned that has good package stability and that may be stored indefinitely at room temperatures without deterioration. The melting point of the lubricant is far above the highest normal room temperatures, and there is no danger that it will soften or melt during shipping, storage or handling.

A further object of this invention is to provide a lubricant of the class above referred to that is inexpensive and simple to manufacture.

The lubricant of the invention has many applications. It may be used to lubricate screws, nails, and the like, and is especially well suited for the lubrication of power driven drills, saws, etc. The invention is capable of modification to adapt it for specific applications, and is not to be construed as limited to the particular uses or details herein described.

The lubricant may be said to comprise generally a suitable grease, turpentine, a solidifying agent and a binder. The grease forms the base or principal ingredient of the lubricant, and further serves as a carrier for the other constituents. In accordance with the invention any suitable mineral oil grease may be employed, it being understood that the character of the final product may be varied to adapt it for given intended uses by varying the nature of the basic grease. I have found it desirable to employ a good grade grease containing mineral oil having a Saybolt viscosity of between 135 and 165 at 212° Fahrenheit, and containing a suitable proportion of sodium soap, calcium soap, or aluminum soap. A preferred grease contains approximately 5½% sodium soap, although satisfactory results are obtainable with calcium soap or aluminum soap greases. The turpentine is employed to render the lubricant product sticky and tacky so as to effectively adhere to the drills or other tools. It is preferred to incorporate the turpentine in the grease before adding the other ingredients. The proportion of turpentine employed may be varied considerably. It has been found desirable to use 25% by weight of turpentine to 75% by weight of grease to form the basic grease mixture of the lubricant. The turpentine, in addition to rendering the final lubricant sticky and tacky, forms a cutting agent for the mixture.

The solidifying agent is important in that it renders the product solid for easy handling, storage shipping and use. The solidifying agent of the invention also has a lubricating value and is fully compatible with the other ingredients. I prefer to use a high melting point paraffin as the solidifying ingredient. It has been found that the high melting point paraffin marketed by the Union Oil Company and known to the trade as Aristowax is particularly effective because it has a melting point of about 160 to 165° F. The proportion of solidifying agent employed will determine the hardness or solidity of the product and may be varied to adapt the lubricant for given applications. Where the lubricant is to be used on drills, saws, and the like, it is preferred to incorporate approximately ten pounds of the paraffin in a twenty-five pound batch of the lubricant mixture. It is to be understood that other makes and grades of high melting point paraffins may be used as the solidifying agent, or if desired, slack wax, a by-product resulting from the refining of petroleum oil, may be employed as the solidifying material.

The binding agent serves to prevent separation of the grease which has a relatively high melting point and the paraffin which has a considerable lower melting point. It prevents such separation during handling and storage of the lubricant, and when a hot tool such as a drill, is thrust into or brought into contact with the solid lubricant. While the proportion of the binding agent may be varied considerably, it is preferred to use only a relatively small amount. Aluminum stearate, sodium stearate or calcium stearate or a suitable combination of two or more of these materials may serve as the binder. It has been found preferable to use aluminum stearate or other suitable stearate soap as the binding agent in the proportion of approximately fifty grams in a twenty-five pound batch of the lubricant mixture.

The following is a typical preferred example of a formula of this invention, it being understood that the example is illustrative and is not to be construed as limiting the invention to the specific ingredients or proportions designated.

*Example*

Mixture of 75% petroleum oil grease and 25% turpentine _____pounds__ 15
Aluminum stearate_____grams__ 50
High melting point paraffin_____pounds__ 10

The procedure in preparing the lubricant is simple. It is preferred to first prepare the grease and turpentine mixture. The turpentine is added to the grease and the two materials are thoroughly mixed together to produce a homogeneous mixture. The aluminum stearate or other selected binding agent is then mixed with the grease and turpentine combination. It is preferred to add the binding agent while subjecting the grease and turpentine mixture to sufficient heat to raise its temperature to approximately 200° Fahrenheit. A suitable mixing technique may be employed to thoroughly diffuse the binder throughout the mixture. The high melting point paraffin or other solidifying agent is then melted and slowly added to the mixture. The temperature of the batch is increased until it reaches from 230° to 250° Fahrenheit. The entire batch of the mixture is stirred thoroughly, while the temperature is maintained, to produce a uniform homogeneous liquid. The hot liquid mixture is then ready for pouring into suitable molds or containers where it is allowed to cool and solidify. The lubricant can be poured into simple molds of suitable shape and size to form convenient blocks, rods or sticks capable of ready handling, storage and use. It has been found convenient to pour the liquid mixture into cylindrical paper or cardboard containers which hold about one-quarter pound of the lubricant. This produces clean, strong packages and facilitates the use of the product. The melting point of the lubricant is between 150° and 155° Fahrenheit and the lubricant is stable and quite strong.

In employing the lubricant, the drill, saw or other tool may be directly run into the stick or body of the lubricant, or where the lubricant is cast in a tube or container of paper, the paper may be torn away to expose the lubricant for contact with the tool. The tool is usually sufficiently hot to melt the engaged part of the solid lubricant, and a substantial portion of the heat is given up at this time so that the tool is effectively cooled. The melted portion of the lubricant fills or partially fills the flutes of the drill and will adhere to the faces or teeth of the tool as the case may be. When a saw is to be lubricated the lubricant is merely wiped on the faces of the blade in the manner in which belt dressing is used on a machine belt. The aluminum stearate, or other binder prevents separation of the grease and solidifying agent when the lubricant is subjected to the heat of the tool. The turpentine causes the lubricant to be tacky so that it firmly adheres to the tool. Accordingly, the lubricant is not thrown free when the tool is moved or rotated rapidly, but remains on the tool to lubricate it during operation. The lubricant of the invention is clean and convenient to handle and assures thorough lubrication of the cutting tool. The lubricant does not readily burn and may be directly exposed to flame without being immediately ignited. Accordingly, there is no fire hazard even where the lubricant is used in the presence of sparks, heat, etc.

It is to be understood that the invention is not to be taken as limited to the express procedure or example set forth above; these details being given only by way of illustration. I do not regard such specific details as essential to the invention except insofar as they are expressed by way of limitation in the appended claims, in which it is my intention to claim the invention as broadly as permissible in view of the prior art.

I claim:

1. A cutting lubricant having improved adherence and work penetrating characteristics and a high melting point consisting essentially of approximately three parts by weight of a mixture of approximately 75% grease, said grease comprising approximately 95% mineral oil having a Saybolt viscosity of between 135 and 165 at 212° Fahrenheit and approximately 5% soap, and approximately 25% turpentine; approximately two parts by weight of paraffin; and approximately 0.44% by weight of aluminum stearate.

2. A lubricant consisting essentially of approximately three parts by weight of a mixture of approximately 75% of a soda base grease and approximately 25% turpentine; approximately two parts by weight of a high melting point paraffin; and approximately 0.44% by weight of sodium stearate for preventing separation of the grease and paraffin.

3. A lubricant consisting essentially of approximately three parts by weight of a mixture of approximately 75% of a soda base grease and approximately 25% turpentine; approximately two parts by weight of a high melting point paraffin; and approximately 0.44% by weight of aluminum stearate to prevent separation of the grease and paraffin.

4. A lubricant consisting essentially of approximately 45% soda base grease; approximately 15% turpentine, approximately 40% high melting point paraffin, and approximately 0.44% sodium stearate.

5. A lubricant comprising on an approximate weight basis 45% soda base grease, 15% turpentine, 40% paraffin, and 0.44% aluminum stearate.

6. A lubricant comprising on an approximate weight basis 45% soda base grease, 15% turpentine, 40% high melting point paraffin, and a 0.44% calcium stearate.

7. A drill lubricant composition consisting of, on an approximate weight basis, 50 parts of soda base grease, 43 parts of paraffin wax having a melting point of about 165° F., 10.4 parts of turpentine and 0.42 part of aluminum stearate.

8. A lubricant consisting essentially of approximately three parts by weight of a mixture of approximately 75% soda base grease and approximately 25% turpentine; approximately two parts by weight high melting point paraffin; and approximately 0.44% by weight calcium stearate.

JACK H. MAGUIRE.

REFERENCES CITED

The following references are of record in the file of this patent:

UNITED STATES PATENTS

| Number | Name | Date |
|---|---|---|
| 1,041,484 | Kern | Oct. 15, 1912 |
| 1,225,044 | Lauber | May 8, 1917 |
| 1,293,107 | Johnson | Feb. 4, 1919 |
| 1,995,371 | Werder | Mar. 26, 1935 |
| 2,116,220 | Shoemaker | May 3, 1938 |
| 2,320,002 | Lutz et al. | May 25, 1943 |

FOREIGN PATENTS

| Number | Country | Date |
|---|---|---|
| 588,376 | Germany | Nov. 17, 1933 |

OTHER REFERENCES

Gray: Properties and Utilization of Petroleum Waxes, article in Journal of Petroleum Institute, vol. 30, pages 57 and 66—Mar. 1944.